United States Patent Office 3,280,116
Patented Oct. 18, 1966

3,280,116
3-(3-OXO-17β-HYDROXYANDROSTA-4,6-DIEN-17α-YL) PROPIONIC ACID LACTONE COMPLEXES AND PROCESS OF USING
Gayle M. Webber, Wilmette, Ill., assignor to G. D. Searle & Co., Chicago, Ill., a corporation of Delaware
No Drawing. Filed Oct. 8, 1965, Ser. No. 494,231
Claims priority, application France, Oct. 8, 1964, 990,719
10 Claims. (Cl. 260—239.57)

This invention relates to 3-(3-oxo-17β-hydroxyandrosta-4,6-dien-17α-yl)propionic acid lactone complexes and a process whereby these complexes are used to isolate 3-(3-oxo-17β-hydroxyandrosta-4,6-dien-17α - yl)propionic acid lactone from solutions thereof. Such solutions commonly contain impurities which render isolation of the lactone both complicated and time-consuming by methods heretofore known in the art. Crystallization and/or chromatography, for example, are frequently unsatisfactory because these prior art isolation procedures depend on differences in the solubility and/or absorption of 3 - (3 - oxo-17β-hydroxyandrosta-4,6-dien-17α-yl)propionic acid lactone vis-a-vis the impurities present therewith which may not, in fact, exist. The process of this invention, on the other hand, affords a reliable and convenient procedure for isolating 3-(3-oxo-17β-hydroxyandrosta-4,6-dien-17α-yl)propionic acid lactone from solutions thereof by contacting the lactone with a suitable phenol in an appropriate reaction medium to form a complex of the lactone with the phenol which can readily be separated and decomposed to give the lactone in highly purified form.

Suitable phenols are those which form sparingly-soluble complexes with 3-(3-oxo-17β-hydroxyandrostadien-17-yl)propionic acid lactone, such as hydroquinone, resorcinal, catechol, and 2-naphthol (as distinct from 1-naphthol). Appropriate reaction media are those which are inert to the reactants and sufficiently solubilizing to facilitate contact between them without adversely affecting differential precipitation of the desired complex free of impurities. In general, polar solvents are best adapted to this purpose, including alkanols such as methanol, ethanol, and 2-propanol; alkyl alkanoates such as ethyl acetate; alkanones such as 2-propanone; alkanenitriles such as acetonitrile; and water. These polar solvents are used alone or in preferably miscible admixture with one another or a non-polar solvent selected from among optionally-alkylated aromatic hydrocarbons such as benzene, toluene, and xylene; aliphatic hydrocarbons such as hexane, heptane, and cyclohexane; ethers such as dioxane; and poly-halogenated hydrocarbons such as dichloromethane, dichloroethane, chloroform, and carbon tetrachloride to decrease the solubility of the desired complex in the reaction medium. Alternatively, reaction media can comprise solely non-polar solvents, provided their solubilizing effects meet the tests hereinbefore set out.

The instant complexes consist of substantially 1 mole of lactone for each 1 mole of phenol, wherefore equimolar amounts of these reactants are commonly, but obvious not necessarily, employed in the described process of use. The amount of reaction medium used is desirably the minimum sufficient to dissolve the reactants at a preferably, but not exclusively, elevated (i.e., above 25°) temperature.

An especially advantageous embodiment of this invention is the use of hydroquinone as the complexing agent in a medium comprising benzene and ethyl acetate.

After contact between lactone and phenol has been completed, precipitation of the resultant complex can be hastened by cooling the reaction mixture and/or evaporating a portion of the solvent present. The complex is then filtered off and can be variously decomposed to provide the purified lactone. A preferred means of accomplishing this is to extract a solution of the complex in chloroform or other water-immiscible solvent with an aqueous inorganic base such as dilute sodium sulfite. Another means to the same end is to heat a mixture of the complex with water and a water-immiscible solvent such as dichloromethane.

The following examples describe in detail illustrative embodiments of this invention. However, the invention is not to be construed as limited thereby, either in spirit or in scope, since it will be apparent to those skilled in the art of organic chemistry that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Purities are based on $\Delta^{4,6}$ content in respect of theory, as determined by ultraviolet absorption.

Example 1

20 parts of a crude mixture containing 15.2 parts of 3-(3-oxo-17β-hydroxyandrosta-4,6 - dien - 17α - yl)propionic acid γ-lactone are dissolved in 53 parts of benzene. To the resulting solution there is added 6.5 parts of hydroquinone in 37 parts of ethyl acetate and the resulting mixture is heated almost to reflux, then cooled slowly to 0°. Upon cooling, precipitation of a solid results. The precipitate is removed by filtration, washed with a cold mixture of benzene and ethyl acetate, then dried in an oven to afford the complex of 3-(3-oxo-17β-hydroxyandrosta-4,6-dien-17α-yl)propionic acid γ-lactone and hydroquinone in a molecular ratio of 1:1, melting at about 179–182°. The complex has a purity of 94%.

A mixture of 18.1 parts of the crude complex obtained by the foregoing procedure and 250 parts of methylene chloride is extracted with a 10% aqueous sodium sulfite solution. The aqueous layer is separated, then extraced with methylene chloride. The methylene chloride extracts are combined, washed successively with a 10% aqueous sodium sulfite solution and water, then dried over sodium sulfate. The sodium sulfate is removed by filtration and the filtrate is evaporated to afford 3-(3-oxo-17β-hydroxyandrosta-4,6-dien-17α-yl)propionic acid γ-lactone, which is crystallized from a 8:3 mixture by volume of dimethylsulfoxide and water, to afford the product of 99% purity, melting at 161–162°.

Example 2

To a solution of 60 parts of crude 3-(3-oxo-17β-hydroxyandrosta-4,6-dien-17α-yl)propionic acid γ-lactone in 160 parts of methanol heated to reflux, there are added 29 parts of hydroquinone. When solution is complete, 100 parts of water are added, and the resulting solution refluxed with 2.5 parts of charcoal for about 30 minutes. The resulting solution is filtered while warm and the filter is washed with a 2:1 mixture by volume of methanol and water. The filtrate and washings are combined, then cooled to 3°, and allowed to stand at that temperature for about 16 hours. The resulting precipitate is washed several times with a cold 2:1 mixture by volume of methanol and water, then dried to afford the complex of 3-(3-oxo-17β-hydroxyandrosta - 4,6 - dien - 17α - yl)propionic acid γ-lactone and hydroquinone in a molecular proportion of 1:1.

Example 3

A solution of 12 parts of crude 3-(3-oxo-17β-hydroxy-4,6-androstadien-17α-yl) propionic acid γ-lactone in about 35 parts of toluene is treated at the reflux temperature with a solution of 5 parts of hydroquinone in 20 parts of water. The mixture is then cooled to 10° and allowed to stand at that temperature for about 16 hours. The resulting precipitate is filtered, washed with several portions of toluene, and dried to afford the complex of 3-(3-oxo-17β-hydroxyandrosta-4,6-dien-17α-yl)propionic acid γ-lactone and hydroquinone in a molecular proportion of 1:1.

*Examples 4 through 14*

The procedure of the first paragraph of Example 1, modified only to the extent that the solvents listed below are substituted for the 53 parts of benzene and 37 parts of ethyl acetate called for, affords in each instance a complex identical with that prepared via Example 1 having the melting point and percent (%) purity indicated below:

| Example | Solvent(s) | Melting Point of Complex, degrees | Percent Purity of Complex |
|---|---|---|---|
| 4 | 96 parts of methanol [1] | 183–185 | 99 |
| 5 | 108 parts of ethyl acetate | 182–184 | 93 |
| 6 | 95 parts of 2-propanol | 178–181 | 90 |
| 7 | 94 parts of ethanenitrile | 181–182 | 93 |
| 8 | 95 parts of 2-propanone | 184–185 | 98 |
| 9 | 36 parts of ethyl acetate and 53 parts of benzene. | 180–182 | 95 |
| 10 | 36 parts of ethyl acetate and 35 parts of benzene. | 180–183 | 95 |
| 11 | 32 parts of methanol and 53 parts of benzene. | 179–181 | 98 |
| 12 | 16 parts of methanol and 35 parts of benzene. | 180–182 | 83 |
| 13 | 40 parts of methanol, 32 parts of water. | 170–175 | 83 |
| 14 | 39 parts of 2-propanone, 32 parts of water, 0.2 parts of sodium sulfite. | 175–178 | 92 |

[1] In this example, the reaction mixture was concentrated to further crystallization of the complex.

*Example 15*

To a mixture of 10 parts of crude 3-(3-oxo-17β-hydroxyandrosta-4,6-dien-17α-yl)propionic acid γ-lactone and 4.1 parts of 2-naphthol there is added sufficient ethyl acetate at reflux temperature to dissolve that mixture. After solution is complete the mixture is chilled to about 0°. Crystallization can be induced by scratching the side of the vessel containing the reaction mixture or by concentration of the reaction mixture. The resultant precipitate is removed by filtration and washed with several portions of cold ethyl acetate, then air dried to afford the complex of 3-(3-oxo-17β-hydroxyandrosta-4,6-dien-17α-yl)propionic acid γ-lactone and 2-naphthol in a molecular ratio of 1:1, melting at about 97–98°.

*Example 16*

Substitution of molecular equivalent quantities of resorcinol and catechol in the procedure of Example 15 affords, respectively, the complex of 3-(3-oxo-17β-hydroxyandrosta-4,6-dien-17α-yl)propionic acid γ-lactone and resorcional in a molecular ratio of 1:1, melting at about 186–189°, and the complex of 3-(3-oxo-17β-hydroxyandrosta-4,6-dien 17α-yl)propionic acid γ-lactone and catechol in a colecular ratio of 1:1, melting at about 135–136°.

What is claimed is:
1. A complex consisting of substantially 1 mole of 3-(3-oxo-17β-hydroxyandrosta-4,6-dien - 17α - yl)propionic acid lactone and 1 mole of dihydroxyphenol or 2-naphthol.
2. The equimolecular complex of 3-(3-oxo-17β-hydroxyandrosta-4,6-dien-17α-yl)propionic acid lactone with hydroquinone.
3. The equimolecular complex of 3-(3-oxo-17β-hydroxyandrosta-4,6-dien - 17α - yl)propionic acid lactone with resorcinol.
4. The equimolecular complex of 3-(3-oxo-17β-hydroxyandrosta-4,6-dien-17α-yl)propionic acid lactone with catechol.
5. The equimolecular complex of 3-(3-oxo-17β-hydroxyandrosta-4,6-dien-17α-yl)propionic acid lactone with 2-naphthol.
6. In a process for isolating 3-(3-oxo-17β - hydroxyandrosta-4,6-dien-17α-yl)propionic acid lactone from a solution thereof, the step which consists of contacting the lactone with a phenol selected from among dihydroxybenzene and 2-naphthol in a medium comprising a polar solvent selected from among alkanols, alkyl alkanoates, alkanones, alkanenitriles, water, and mixtures thereof, to form a sparingly-soluble complex of the lactone with the phenol.
7. In a process for isolating 3-(3-oxo - 17β - hydroxyandrosta-4,6-dien-17α-yl)propionic acid lactone from a solution thereof, the step which consists of contacting the lactone with a phenol selected from among dihydroxybenzene and 2-naphthol in a medium comprising a polar solvent selected from among alkanols, alkyl alkanoates, alkanones, alkanenitriles, water, and mixtures thereof in the presence of a non-polar solvent selected from among optionally-alkylated benzene, alkanes, cycloalkanes, dioxane, and polyhalogenated hydrocarbons, to form a sparingly-soluble complex of the lactone with the phenol.
8. In a process for isolating 3-(3-oxo - 17β - hydroxyandrosta-4,6-dien-17α-yl)propionic acid lactone from a solution thereof, the step which consists of contacting the lactone with hydroquinone in a medium comprising methanol, ethanol, 2-propanol, ethyl acetate, 2-propanone, acetonitrile, water, or mixtures thereof, to form an equimolecular complex of the latcone with the hydroquinone.
9. The process of isolating 3-(3-oxo - 17β - hydroxyandrosta-4,6-dien-17α-yl)propionic acid lactone from a solution thereof which comprises contacting the solution with hydroquinone in a mixture of alkyl alkanoate and optionally-methylated benzene at an elevated temperature to form an equimolecular complex of the lactone with the hydroquinone.
10. The process of isolating 3-(3-oxo - 17β - hydroxyandrosta-4,6-dien-17α-yl)propionic acid lactone from a solution thereof which comprises contacting the solution with hydroquinone in a mixture of ethyl acetate and benzene at an elevated temperature to form an equimolecular complex of the lactone with the hydroquinone.

No references cited.

LEWIS GOTTS, *Primary Examiner.*

THOMAS M. MESHBESHER, *Assistant Examiner.*